US006912592B2

(12) United States Patent
Yip

(10) Patent No.: US 6,912,592 B2
(45) Date of Patent: Jun. 28, 2005

(54) METHOD AND SYSTEM OF AGGREGATE MULTIPLE VLANS IN A METROPOLITAN AREA NETWORK

(75) Inventor: Michael Yip, Sunnyvale, CA (US)

(73) Assignee: Extreme Networks, Inc., Santa Clara, CA (US)

( * ) Notice: Subject to any disclaimer, the term of this patent is extended or adjusted under 35 U.S.C. 154(b) by 28 days.

(21) Appl. No.: 09/755,498

(22) Filed: Jan. 5, 2001

(65) Prior Publication Data

US 2002/0091795 A1 Jul. 11, 2002

(51) Int. Cl.[7] .............................................. G06F 15/16
(52) U.S. Cl. ...................... 709/249; 709/218; 709/220; 709/225; 709/230; 370/94; 370/85; 370/359; 370/392; 370/401
(58) Field of Search ............................ 370/94, 85, 392, 370/401, 359; 709/218, 220, 225, 230, 249

(56) References Cited

U.S. PATENT DOCUMENTS

| | | | |
|---|---|---|---|
| 5,394,402 A | * | 2/1995 | Ross |
| 5,732,078 A | | 3/1998 | Arango |
| 5,737,333 A | | 4/1998 | Civanlar et al. |
| 5,742,604 A | | 4/1998 | Edsall et al. |

(Continued)

OTHER PUBLICATIONS

William S. Biedron, Metropolitan Area Network Service Comprised of Virtual Local Area Networks Running over Hybrid–Fiber/Coax and Asynchronous Transfer Mode Technologies, SPIE, vol. 2609–06, pp. 50–57, Oct. 23, 1995.*

IEEE Std 802.1Q–1998, "IEEE Standards for Local and Metropolitan Area Networks: Virtual Bridged Local Area Networks," New York, New York, 1999.
B. Kantor, "Internet Protocol Encapsulation of AX.25 Frames," Request for Comments: 1226, May 1991 ("RFC1226").
K. Egevang, "The IP Network Address Translator (NAT)," Request for Comments: 1631, May 1994, ("RFC1631").
W. Simpson, "IP in IP Tunneling," Request for Comments 1853, Oct. 1995, ("RFC1853").
C. Perkins, "IP Encapsulation within IP," Request for Comments 2003, Oct. 1996, ("RFC2003").
K. Hamzeh, et al., "Point–to–Point Tunneling Protocol (PPTP)," Request for Comments 2637, Jul. 1999, ("RFC2637").
D. Farinacci, et al., "Generic Routing Encapsulation (GRE)," Request for Comments 2784, Mar. 2000, ("RFC2784").

*Primary Examiner*—Hosain Alam
*Assistant Examiner*—Michael Y Won
(74) *Attorney, Agent, or Firm*—Blakely, Sokoloff, Taylor & Zafman LLP

(57) ABSTRACT

A method and system is provided in which data packets from multiple customer VLANs are forwarded over a MAN using VLAN aggregation. A layer-2 switch located at the edge of the MAN connects the customer VLANs to the MAN. The edge switch aggregates multiple customer VLANs (the "sub-VLANs") into one provider VLAN (the "super-VLAN"). When a packet is forwarded from the sub-VLAN to the super-VLAN and vice versa, the edge switch uses modified bridge forwarding rules to exchange the customer-configured VLAN-IDs with the provider-configured VLAN-IDs before transporting the packet over the MAN. The edge switch further uses modified bridge media access control (MAC) address learning rules to isolate one customer's traffic from another's (i.e. isolate one sub-VLAN's traffic from another sub-VLAN's traffic).

24 Claims, 3 Drawing Sheets

U.S. PATENT DOCUMENTS

| | | | |
|---|---|---|---|
| 5,793,763 A | | 8/1998 | Mayes et al. |
| 5,802,047 A | * | 9/1998 | Kinoshita |
| 5,802,106 A | | 9/1998 | Packer |
| 5,862,452 A | | 1/1999 | Cudak et al. |
| 5,909,686 A | | 6/1999 | Muller et al. |
| 5,910,955 A | | 6/1999 | Nishimura et al. |
| 5,914,938 A | * | 6/1999 | Brady et al. |
| 5,926,463 A | | 7/1999 | Ahearn et al. |
| 5,938,736 A | | 8/1999 | Muller et al. |
| 5,946,308 A | * | 8/1999 | Dobbins et al. |
| 5,949,783 A | | 9/1999 | Husak et al. |
| 5,959,989 A | * | 9/1999 | Gleeson et al. |
| 5,968,126 A | * | 10/1999 | Ekstrom et al. ............ 709/225 |
| 5,978,378 A | | 11/1999 | Van Seters et al. |
| 6,006,258 A | | 12/1999 | Kalajan |
| 6,006,264 A | | 12/1999 | Colby et al. |
| 6,006,272 A | | 12/1999 | Aravamudan et al. |
| 6,012,090 A | | 1/2000 | Chung et al. |
| 6,018,619 A | | 1/2000 | Allard et al. |
| 6,023,724 A | | 2/2000 | Bhatia et al. |
| 6,028,848 A | | 2/2000 | Bhatia et al. |
| 6,029,203 A | | 2/2000 | Bhatia et al. |
| 6,032,194 A | | 2/2000 | Gai et al. |
| 6,035,105 A | * | 3/2000 | McCloghrie et al. |
| 6,047,325 A | | 4/2000 | Jain et al. |
| 6,049,834 A | | 4/2000 | Khabardar et al. |
| 6,052,803 A | | 4/2000 | Bhatia et al. |
| 6,058,106 A | | 5/2000 | Cudak et al. |
| 6,058,431 A | | 5/2000 | Srisuresh et al. |
| 6,085,238 A | | 7/2000 | Yuasa et al. |
| 6,088,356 A | | 7/2000 | Hendel et al. |
| 6,094,435 A | | 7/2000 | Hoffman et al. |
| 6,094,659 A | | 7/2000 | Bhatia |
| 6,098,172 A | | 8/2000 | Coss et al. |
| 6,104,696 A | | 8/2000 | Kadambi et al. |
| 6,104,700 A | | 8/2000 | Haddock et al. |
| 6,105,027 A | | 8/2000 | Schneider et al. |
| 6,108,330 A | | 8/2000 | Bhatia et al. |
| 6,115,278 A | | 9/2000 | Deneroff et al. |
| 6,118,768 A | | 9/2000 | Bhatia et al. |
| 6,118,784 A | | 9/2000 | Tsuchiya et al. |
| 6,119,162 A | | 9/2000 | Li et al. |
| 6,119,171 A | | 9/2000 | Alkhatib |
| 6,128,657 A | | 10/2000 | Okanoya et al. |
| 6,131,163 A | | 10/2000 | Wiegel |
| 6,141,749 A | | 10/2000 | Coss et al. |
| 6,147,995 A | * | 11/2000 | Dobbins et al. |
| 6,151,316 A | | 11/2000 | Crayford et al. |
| 6,151,324 A | * | 11/2000 | Belser et al. |
| 6,154,446 A | | 11/2000 | Kadambi et al. |
| 6,154,775 A | | 11/2000 | Coss et al. |
| 6,154,839 A | | 11/2000 | Arrow et al. |
| 6,157,647 A | * | 12/2000 | Husak |
| 6,157,955 A | | 12/2000 | Narad et al. |
| 6,167,052 A | | 12/2000 | McNeill et al. |
| 6,167,445 A | | 12/2000 | Gai et al. |
| 6,170,012 B1 | | 1/2001 | Coss et al. |
| 6,178,455 B1 | | 1/2001 | Schutte et al. |
| 6,178,505 B1 | | 1/2001 | Schneider et al. |
| 6,181,681 B1 | | 1/2001 | Hiscock et al. |
| 6,181,699 B1 | * | 1/2001 | Crinion et al. |
| 6,182,226 B1 | | 1/2001 | Reid et al. |
| 6,182,228 B1 | | 1/2001 | Boden et al. |
| 6,188,694 B1 | * | 2/2001 | Fine et al. ................. 370/402 |
| 6,195,351 B1 | * | 2/2001 | Hiscock et al. |
| 6,195,705 B1 | | 2/2001 | Leung |
| 6,202,114 B1 | | 3/2001 | Dutt et al. |
| 6,208,649 B1 | * | 3/2001 | Kloth |
| 6,208,656 B1 | | 3/2001 | Hrastar et al. |
| 6,212,558 B1 | | 4/2001 | Antur et al. |
| 6,216,167 B1 | | 4/2001 | Momirov |
| 6,219,706 B1 | | 4/2001 | Fan et al. |
| 6,219,739 B1 | | 4/2001 | Dutt et al. |
| 6,226,267 B1 | | 5/2001 | Spinney et al. |
| 6,226,771 B1 | * | 5/2001 | Hilla et al. ................. 714/758 |
| 6,230,203 B1 | | 5/2001 | Koperda et al. |
| 6,243,749 B1 | | 6/2001 | Sitaraman et al. |
| 6,243,754 B1 | | 6/2001 | Guerin et al. |
| 6,243,815 B1 | | 6/2001 | Antur et al. |
| 6,246,669 B1 | | 6/2001 | Chevalier et al. |
| 6,249,523 B1 | | 6/2001 | Hrastar et al. |
| 6,252,888 B1 | | 6/2001 | Fite, Jr. et al. |
| 6,253,122 B1 | | 6/2001 | Razavi et al. |
| 6,256,314 B1 | | 7/2001 | Rodrig et al. |
| 6,262,976 B1 | | 7/2001 | McNamara |
| 6,266,707 B1 | | 7/2001 | Boden et al. |
| 6,269,099 B1 | | 7/2001 | Borella et al. |
| 6,430,621 B1 | * | 8/2002 | Srikanth et al. ............ 709/238 |
| 6,526,052 B1 | * | 2/2003 | Rijhsinghani et al. |
| 6,553,028 B1 | | 4/2003 | Tang et al. |
| 6,614,787 B1 | | 9/2003 | Jain et al. |
| 6,614,792 B1 | | 9/2003 | Pazy et al. |
| 6,674,760 B1 | | 1/2004 | Walrand et al. |

* cited by examiner

METHOD AND SYSTEM OF AGGREGATE MULTIPLE VLANS IN A METROPOLITAN AREA NETWORK

BACKGROUND OF THE INVENTION

1. Field of the Invention

The present invention relates to the field of metropolitan area network (MAN) topologies and internetwork communications technologies. In particular, the present invention relates aggregating multiple virtual local area networks (VLANs) into a MAN using VLAN identifier (VLAN ID) exchange.

2. Background Information and Description of Related Art

A metropolitan area network (MAN) is a network that interconnects users with computer resources in a geographic area or region larger than that covered by a local area network but smaller than the area covered by a wide area network. The term is typically applied to the interconnection of networks in a city into a single larger network (which may then also offer efficient connection to a wide area network). The amount of data traffic being sent over MANs is increasing at an exponential rate. This is due in part to the increasingly ubiquitous use of the Internet by consumers and businesses, as well as the increasingly bandwidth-intensive nature of the Internet applications that are being deployed.

An important aspect of MANs is the ability of MAN service providers to create virtual private network network connections (VPNs) across a single MAN infrastructure, referred to as a virtual metropolitan area network (VMAN). VMANs allow customers having multiple locations within a metropolitan area to transport private traffic, including virtual local area network (VLAN) traffic, over the shared single MAN.

However, the use of VMANs to handle traffic from multiple customers over a single MAN creates access and security issues. Therefore, it is important to segregate one customer from another so that there is no co-mingling of traffic.

In addition, customer traffic must be transported over the VMAN without interfering with the customers' own higher-layer protocols such as DECnet, or private IP subnets. For example, the DECnet Phase IV protocol can cause problems when routed to a Layer 2 MAN because the DECnet protocol changes the media access control (MAC) address in the packet's Layer 2, or Data Link layer, header. Since duplicate MAC addresses are typically not allowed, VMAN service providers end up managing DECnet streams by hand-something which neither the provider nor the customer wants.

The use of VMANs to handle traffic from multiple customers over a single MAN can also present scalability problems. For example, when switching VLANs based on the Institute for Electrical and Electronics Engineers (IEEE) 802.1Q standard, the traditional system-wide upper limit of VLANs that can be handled while maintaining complete 802.1Q interoperability is 4,096. This may be insufficient for MAN service providers that need to provide network services to buildings having large numbers of individual customers connected to the network via traditional layer-2 VLANs.

Accordingly, a new approach is needed to securely manage traffic in a VMAN network architecture which does not interfere with higher level protocols and which is highly scalable.

SUMMARY

According to one aspect of the invention, a method and system is provided in which data packets from multiple customer VLANs are forwarded over a MAN using VLAN aggregation. A layer-2 switch located at the edge of the MAN connects the customer VLANs to the MAN. The edge switch aggregates multiple customer VLANs (the "sub-VLANs") into one provider VLAN (the "super-VLAN"). When a packet is forwarded from the sub-VLAN to the super-VLAN and vice versa, the edge switch uses modified bridge forwarding rules to exchange the customer-configured VLAN-IDs with the provider-configured VLAN-IDs before transporting the packet over the MAN via a VMAN layer-2 switch or MAN layer-3 router. The edge switch further uses modified bridge media access control (MAC) address learning rules to isolate one customer's traffic from another's (i.e. isolate one sub-VLAN's traffic from another sub-VLAN's traffic).

According to one aspect of the invention, apparatus are provided to carry out the above and other methods.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION OF THE INVENTION

Figure 1:
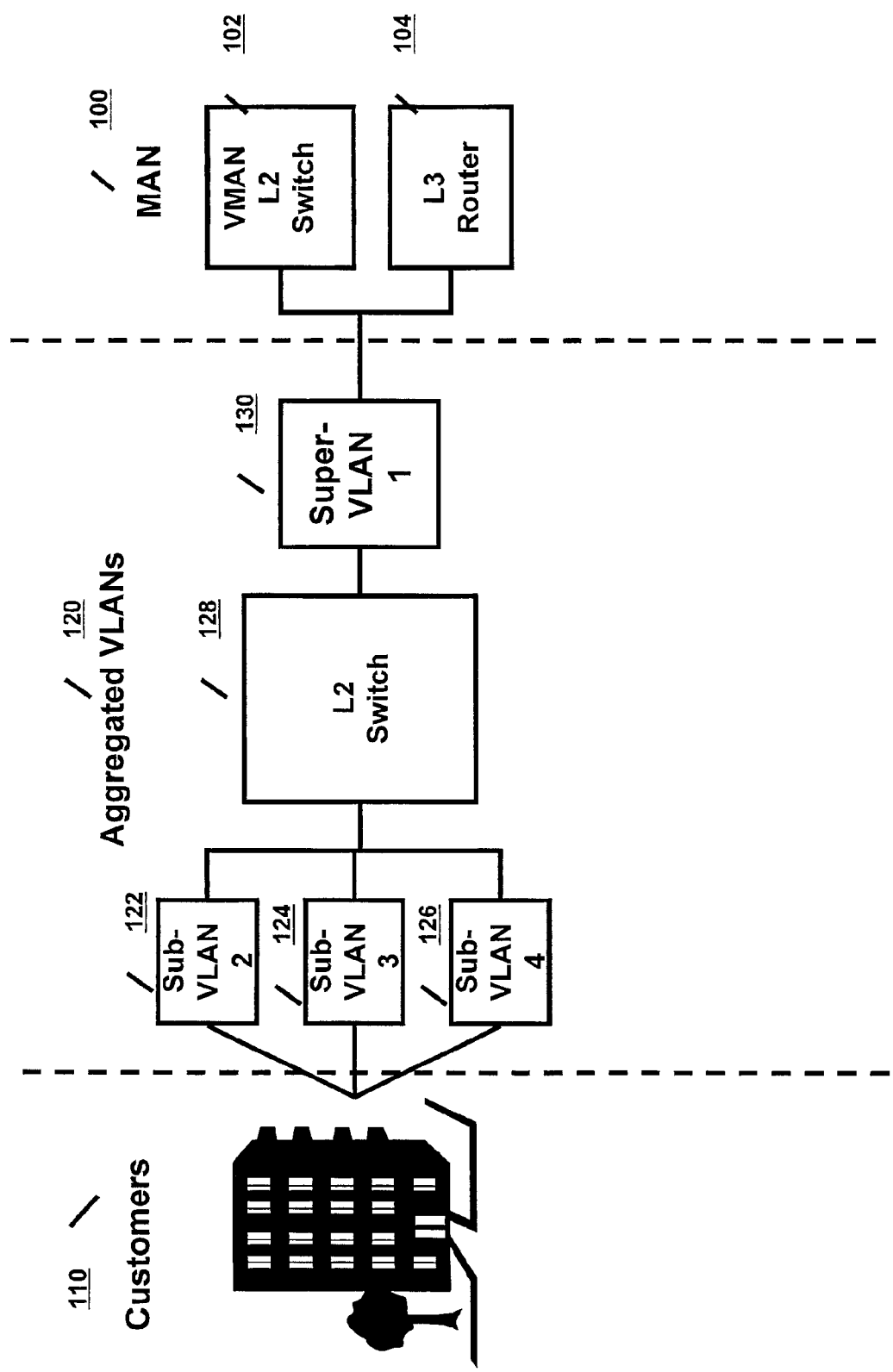
FIG. 1 illustrates a diagram overview of a Metropolitan Area Network (MAN) configuration and aggregated VLANs in accordance with one embodiment of the present invention.

In the following description various aspects of the present invention, a method and system in which data packets from multiple customer VLANs are forwarded over a MAN using VLAN aggregation, will be described. Specific details will be set forth in order to provide a thorough understanding of the present invention. However, it will be apparent to those skilled in the art that the present invention may be practiced with only some or all of the described aspects of the present invention, and with or without some or all of the specific details. In some instances, well known architectures, steps, and techniques have not been shown to avoid unnecessarily obscuring the present invention. For example, specific details are not provided as to whether the method and system is implemented in a router, server or gateway, as a software routine, hardware circuit, firmware, or a combination thereof.

Various operations will be described as multiple discrete steps performed in turn in a manner that is most helpful in understanding the present invention. However, the order of description should not be construed as to imply that these operations are necessarily performed in the order they are presented, or even order dependent. Lastly, repeated usage of the phrase "in one embodiment" does not necessarily refer to the same embodiment, although it may.

A virtual local area network (VLAN) is a logical grouping of networked host computers on some other basis than the physical network location (e.g. customer, department, etc.).

VLANs can be implemented in a number of different ways, depending on the network strategy. A prior art traditional layer-2 VLAN is based on a logical grouping of the layer-2 switch ports to which the hosts connect. Alternative prior art layer-2 VLANs define VLAN membership by the host's Media Access Control (MAC) layer address.

In some VLAN applications, data packets originating within a VLAN may carry a VLAN identification (VLAN ID) that can be used to provide intra-VLAN communication over a metropolitan area network (MAN) using existing layer-2 VLAN forwarding mechanisms. The existing VLAN forwarding mechanisms include both proprietary and non-proprietary VLAN communication protocols. Currently, there is no single official standard protocol for communication of VLAN information. The method most commonly used is known as "frame-tagging." In frame-tagging, packets originating from a host belonging to a VLAN acquire a VLAN ID as they are switched onto a shared backbone network. The VLAN ID is what enables the receiving switches to forward the packets intelligently by switching the packets to only those switches that are members of the same VLAN.

A non-proprietary VLAN communication protocol has been incorporated into the Institute for Electrical and Electronics Engineers (IEEE) 802.1Q standard, whereby the VLAN ID is part of the IEEE 802.1Q header inserted between the layer-2 Data Link header (i.e. the Media Access Control (MAC) header) and the frame's user data. This is also referred to as an 802.1Q tagged frame.

One way of using VLANs is to aggregate multiple VLANs hierarchically into a single "super-VLAN." The super-VLAN is then used to manage network traffic originating from the multiple VLANs, also referred to as sub-VLANs. An example of aggregated VLAN architecture is described in a related application entitled "Method and System for VLAN Aggregation," which is assigned to Extreme Networks, Incorporated, the assignee of the present invention.

In one aspect of the present invention, an aggregated VLAN architecture is used to create a virtual private network within a metropolitan area network (MAN), also referred to as a virtual MAN (VMAN). Referring now to FIG. 1, wherein a block diagram overview of a MAN configuration and aggregated VLANS 120 in accordance with one embodiment of the present invention is shown. As illustrated, a MAN 100 includes a VMAN layer-2 switch 102 and/or a layer-3 router 104. Multiple customers 110, each having separate sub-VLANs, sub-VLAN2 122, sub-VLAN 3 124, and sub-VLAN 4 126, are aggregated into super-VLAN 1 130 by a layer-2 edge switch 128 located at the edge of the MAN 100. As shown, the sub-VLANs 122, 124, and 126 are the customer-facing VLANs, whereas the super-VLAN 130 is the MAN-facing VLAN. The edge switch 128 forwards data packets originating from the customer sub-VLANs 122, 124, and 126 through the super-VLAN 1 130 and over the MAN 100 using the VMAN layer-2 switch 102 or the layer-3 router 104.

In one embodiment, data packets originating from the sub-VLANs may be tagged with a VLAN ID using an 802.1Q tag or other type of tagging scheme. In another embodiment, the data packets are not tagged. Either way, the edge switch 128 aggregates the sub-VLANs 122, 124, and 126 into the super-VLAN 130 by classifying the tagged or untagged packets according to the aggregated VLAN 120 configuration. The aggregated VLAN 120 configuration is typically pre-defined on the edge switch 128 by the MAN service provider, and is transparent to the individual customers whose VLANs are being aggregated. If the customer uses frame tagging, then the edge switch 128 simply verifies whether the VLAN ID specified in the data packet's 802.1Q tag is one of the configured VLAN IDs. If it is not one of the configured VLAN IDs according to the aggregated VLAN 120 configuration, then the data packet is rejected. If the data packet is untagged, then the edge switch will assign a VLAN ID to the data packet, again according to the aggregated VLAN 120 configuration.

Similarly, data packets originating from the super-VLAN 130 may be tagged with a VLAN ID using an 802.1Q tag or other typo of tagging scheme. In another embodiment, the data packets are not tagged. Either way, the edge switch 128 classifies the tagged or untagged packets according to the aggregated VLAN 120 configuration. If the data packet is tagged, then the edge switch 128 simply verifies whether the VLAN ID specified in the data packet's 802.1Q tag is the configured super-VLAN's VLAN ID. If not, then the data packet is rejected. If the data packet is untagged, then the edge switch will assign a super-VLAN VLAN ID to the data packet according to the aggregated VLAN 120 configuration.

In one embodiment, the aggregated VLAN 120 configuration is composed of one sub-VLAN/VLAN ID for each customer and a single super-VLAN/VLAN ID. However, other aggregated VLAN 120 configurations may be employed without departing from the principles of the invention.

When the data packets are transported over the MAN 100 the MAN service provider must insure that the data packet is segregated from other customer traffic so as not to compromise the security of the packet or cause conflict with other customer traffic. For example, in residential buildings having layer-2 networks, it is important that each home not be able to communicate with each other, but only with the router of the MAN to which they are connected. In some cases, the segregation can be accomplished with a virtual MAN (VMAN) tunneling protocol, in which case the data packets are encapsulated with a VMAN ID tag before being forwarded over the MAN as described in related application "Method and System for VMAN Protocol Layer-2 Packet Re-encapsulation." However, for some MAN service providers, segregating traffic using a VMAN protocol may be insufficient to handle the volume of individual customers. One reason is that there are only a limited number of VMAN ID tags that can be assigned to data packets using a VMAN protocol; moreover, the VMAN switch at the core of the MAN can only switch up to 4096 individual VMANs. Another reason is that the VMAN protocol does not work with a MAN core that is composed of layer-3 routers instead of layer-2 switches. Therefore, a different approach to segregating traffic is employed in the method of the present invention. Two aspects of the method are the modified bridge MAC address learning rules and the modified bridge forwarding rules as described below.

Figure 2A:
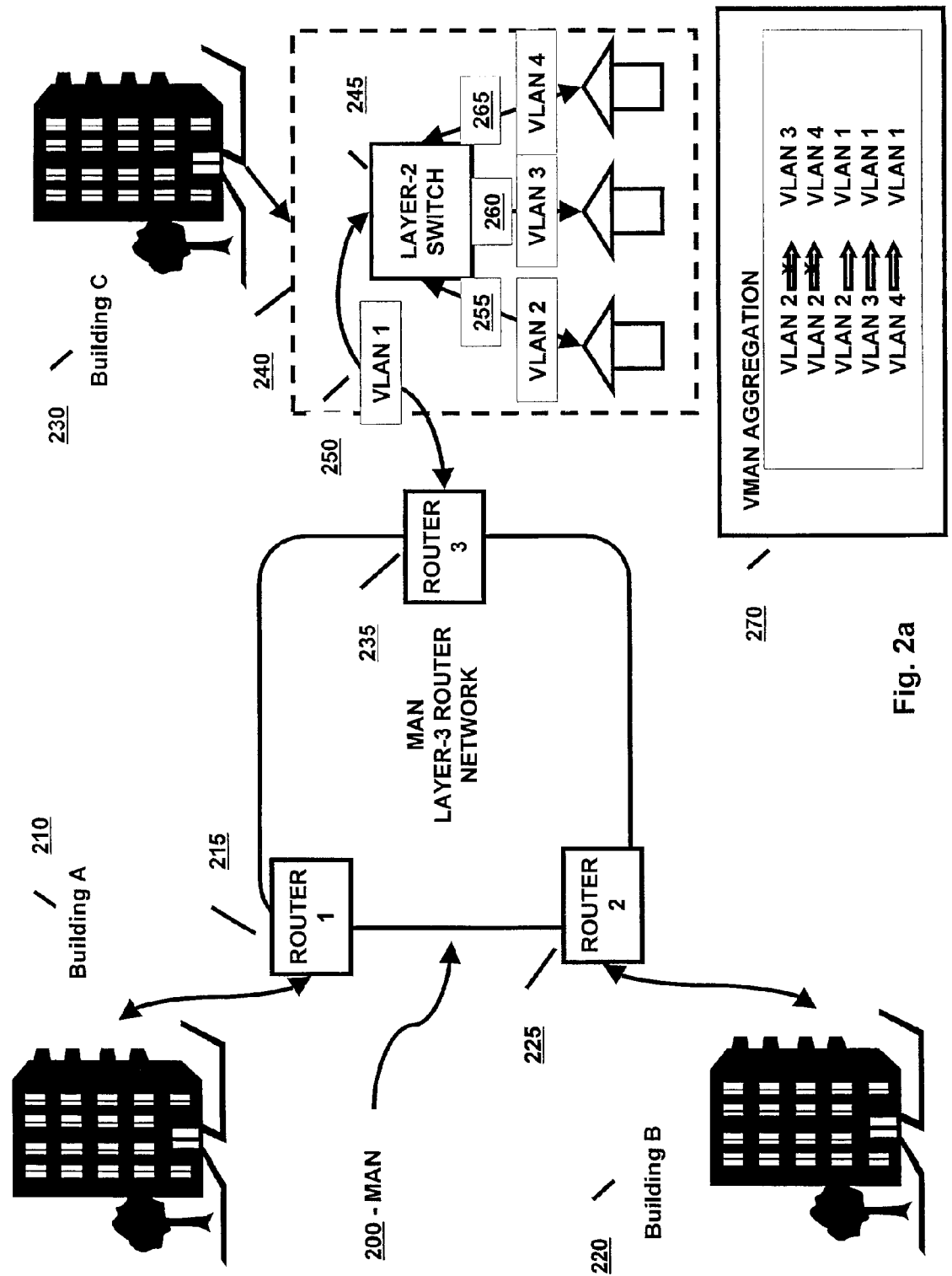
FIG. 2a illustrates an example implementation of using VLAN aggregation in a MAN in accordance with one embodiment of the present invention.
Figure 2B:
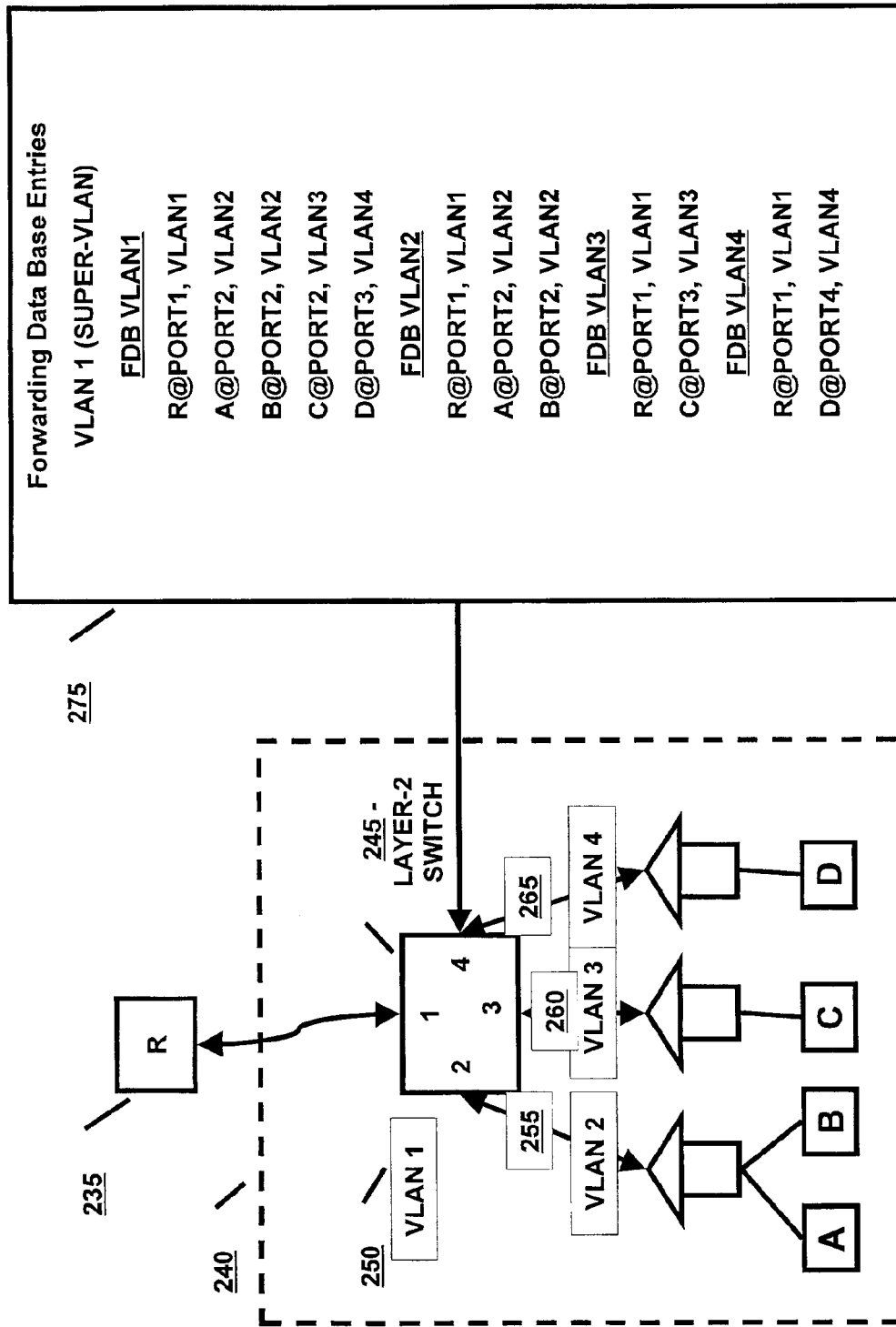
FIG. 2b illustrates the layer-2 edge switch of FIG. 2a in further detail.

Specifically, in one embodiment, once the data packets have been classified with the proper VLAN-ID, the edge switch 128 uses the modified bridge MAC address learning rules to isolate one customer's traffic from another customer's traffic. The modified bridge MAC address learning rules are derived as follows: when a new MAC address is learned from the sub-VLANs, the address is added in both the sub-VLAN's and the super-VLAN's MAC-forwarding data base (FDB) table; when a new MAC address is learned from the super-VLAN, the address is added to all of the sub_ VLANs' and the super-VLAN's MAC-FDB table. An example of FDB entries is shown in FIG. 2b in FDB Entries 275, as detailed in an example implementation described below.

When a packet is forwarded from the sub-VLAN to the super-VLAN and vice versa, the edge switch further uses the modified bridge forwarding rules to exchange the customer-configured VLAN-IDs with the provider-configured VLAN-IDs before transporting the packet over the MAN 100 via the VMAN layer-2 switch 102 or MAN layer-3 router 104. In this way, the customer's layer-2 configuration is transparent to the MAN, and the MAN provider can achieve greater scalability.

Specifically, in one embodiment, when a data packet is forwarded from the sub-VLAN to the super-VLAN, the original VLAN-ID of the sub-VLAN is exchanged with the super-VLAN's VLAN-ID and forwarded out into the super-VLAN and over the MAN using the VMAN layer-2 switch or layer-3 router. Conversely, when a packet is forwarded from the super-VLAN to the sub-VLAN, the original VLAN-ID of the super-VLAN is exchanged with the sub-VLAN's VLAN ID and forwarded out into the sub-VLAN and to the customer. The super-VLAN's original VLAN ID is configured by the MAN service provider, and the sub-VLANs' original VLAN IDs are configured by the customers.

When using the modified bridge forwarding rules to exchange the customer-configured VLAN-IDs with the provider-configured VLAN-IDs, the edge switch 128 may obtain the "original VLAN ID" either directly from the data packet, as in the case of tagged data packets, or from the classification result (i.e. the VLAN ID assignment) internal to the switch, as in the case of untagged data packets.

As can be seen from the foregoing description, the illustrated embodiment of the present invention makes it possible to create separate customer and provider domains for data packets transported over a single MAN 100. The customer domain is preserved by the edge switch 128 by using the modified bridge forwarding rules to exchange the customer-configured VLAN-IDs with the provider-configured VLAN-IDs before transporting the packet over the MAN 100 and vice versa. The ability to create different VLAN aggregation configurations gives the MAN service provider a opportunity to create VMANs for their own use that can transport traffic from a greater number of customers than are transported with other methods, and without interfering with the flow of customer traffic.

For example, provider VMANs created using the VLAN aggregation methods of the present invention can be used to connect customers to third-party services such as Internet Service Providers (ISPs) or Application Service Providers (ASPs). Since the connections to the ISPs and ASPs are transported over a VMAN, the customers can easily switch ISPs without disrupting their service. MAN service providers can also use VMANs to consolidate traffic and centralize value-added services like VPNs or managed firewalls. Rather than being forced to install and maintain equipment on or near the customer premises—an expensive, labor-intensive task—providers can aggregate customer traffic for value-added services at a central office. This not only saves on the cost of providing administrative staff, but achieves better economies of scale and gives customers more reliable service. Better economies of scale are achieved due in part to the fact that with VLAN aggregation each edge switch can accommodate more than the 4096 customers dictated by the 802.1Q limit of 4096 VLANs in a single VMAN. This is especially important since each VMAN core switch can only set up and manage up to 4096 VMANs. Thus, the more customers that can be accommodated in a single VMAN, the better the scalability.

In the illustrated embodiment, multiple customer VLANs are aggregated into a single super-VLAN. However, it should be understood that other types of networks may be aggregated without departing from the principles of or exceeding the scope of the present invention. Moreover, while the description of the embodiments of the present invention address the method and system as it applies to use by a MAN service provider, it is appreciated by those of ordinary skill in the art that method is generally applicable to any network service provider that services multiple customers over any Internetworking application including, Local Area Networks (LANs), and Wide Area Networks (WANs).

An example implementation of one embodiment of the method and system of the present invention will now be described. With reference to FIG. 2a, customers in Building A 210 are connected to a MAN layer-3 router network 200 via Router 1 215, customers in Building B 220 are connected via Router 2 225, and customers in Building C 235 are connected via Router 3 235. As shown, the Building C network 240 is comprised of a layer-2 switch 245 (i.e. the edge switch) that connects sub-VLANs VLAN 2 255, VLAN 3 260, and VLAN 4 265 to super-VLAN VLAN1 250. The layer-3 Router 3 235 receives from the layer-2 switch 245 an 802.1Q tagged frame specifying a data packet with a .1Q tag VLAN ID=VLAN1, belonging to the super-VLAN VLAN 1 250 in Building C 230. Router 3 235 forwards the data packet over the MAN 200 based on Internet Protocol (IP) routing rules. In the reverse direction, Router 3 235 receives from one of the other routers router 1 215, or router 2 220, a data packet destined for a customer in Building C 230. Router 3 235 forwards the data packet to super-VLAN 1 250 via the layer-2 switch 245. The layer-2 switch 245 exchanges the super-VLAN's VLAN ID (VLAN 1) with the customer-configured destination VLAN ID (e.g. VLAN 2), and then forwards the data packet to the destination customer in Building C 235.

An advantage of the VLAN aggregation is that it allows the MAN service provider to deploy multiple sites with layer 2 point-to-multipoint connections. The use of VLAN aggregation to create a VMAN centralizes routing, servers, and services while maintaining simple layer-2 distribution without compromising network security between customers. With reference again to the illustrated embodiment in FIG. 2a, the inter-customer isolation is apparent from the permissible inter-VLAN communications using VMAN aggregation 270 shown as follows: VLAN 2 cannot communicate with either VLAN 3 or 4, but can communicate with super-VLAN 1. Likewise, VLAN3 and VLAN4 can only communicate with super-VLAN 1, and not with each other or with VLAN 2.

With reference to FIG. 2b, the permissible inter-VLAN communication of the illustrated embodiment is shown in further detail. The Layer-2 switch 245 is equipped with 4 ports, numbered 1–4. The modified bridge MAC address learning rules are stored in the forwarding data base (FDB) 275 of the layer-2 switch 245. The FDB 275 contains the MAC addresses that can be received on all of the layer-2 switch's ports, and uses the information to decide whether a data packet should be forwarded or filtered. Each FDB entry consists of the MAC address of the device, an identifier for the port on which it was received, and an identifier for the VLAN to which the device belongs. As shown, devices A and B are connected to VLAN2 255 via port 2, device C is connected to VLAN 3 260 via port 3, and device D is connected to VLAN4 265 via port 4. Port 1 is used to connect to Router R 235 which, in turn, connects the layer-2 switch 245 to the MAN layer-3 router network 200.

Another advantage to using VLAN aggregation to create a VMAN is that it also allows each customer to independently use VLAN tagging schemes such as the standard IEEE 802.1Q frame tagging, thereby simplifying administrative issues because each customer requires no knowledge of the super-VLAN ID assigned to them. In addition, VLAN aggregation ensures that the service provider infrastructures retain highly scalable characteristics. For example, VLAN aggregation allows scaling beyond the traditional system-wide limit of U.S. Pat. No. 4,096 802.1Q VLANs while maintaining complete 802.1Q interoperability. By exchanging the customer-configured VLAN 802.1Q tags with provider-configured tags, these values are made only locally significant and thus tag re-use can occur in the network. Additionally, similar to the traffic isolation concepts of VLAN aggregation, individual customer VLANs may be aggregated and appear as one tagged super-VLAN within the core of the service provider's MAN while still providing inter-customer traffic isolation.

Accordingly, a novel method and system is described for using VLAN aggregation to forward data packets by a MAN switch connecting multiple customers across a single MAN infrastructure. From the foregoing description, those skilled in the art will recognize that many other variations of the present invention are possible. In particular, while the present invention has been described as being implemented in a network comprising one or more MAN switches, such as edge switch 128, a core VMAN layer-2 switch 102, a core VMAN layer-3 router 104, a super VLAN 130, and customer VLANs 122, 124, and 126, some of the logic may be distributed in other components of a network or internetwork application.

For example, embodiments of the invention may be represented as a software product stored on a machine-accessible medium (also referred to as a computer-readable medium or a processor-readable medium). The machine-accessible medium may be any type of magnetic, optical, or electrical storage medium including a diskette, CD-ROM, memory device (volatile or non-volatile), or similar storage mechanism. The machine-accessible medium may contain various sets of instructions, code sequences, configuration information, or other data. As an example, the procedures described herein for aggregating a customer VLAN into a super-VLAN by edge switch 128, for performing the modified bridge MAC address learning rules, for performing the modified bridge forwarding rules, or forwarding an aggregated VLAN data packet by a MAN core switch 102 or router 104, may be stored on the machine-accessible medium. Those of ordinary skill in the art will appreciate that other instructions and operations necessary to implement the described invention may also be stored on the machine-accessible medium.

Thus, the present invention is not limited by the details described. Instead, the present invention can be practiced with modifications and alterations within the spirit and scope of the appended claims.

What is claimed is:

1. A system comprising:
   a metropolitan area network (MAN);
   a first virtual local area network (VLAN);
   a second VLAN, wherein the second VLAN subsumes the first VLAN;
   a first switch coupled to the first and second VLANs, the first switch to receive from the first VLAN a data packet having a first VLAN ID associated with the first VLAN, to replace the first VLAN ID with a second VLAN ID associated with the second VLAN, and to forward the modified data packet to the second VLAN; and
   a second switch coupled to the MAN and the second VLAN, the second switch to receive from the second VLAN the modified data packet and to forward the modified data packet to the MAN.

2. The system of claim 1, wherein the second VLAN also subsumes a third VLAN, and wherein the first switch further to prevent the modified data packet from the first VLAN from being forwarded to the third VLAN.

3. The system of claim 2, wherein the first switch to further maintain a forwarding data base (FDB) for the first, second, and third VLANs, wherein each FDB contains one or more media access control (MAC) address entries.

4. The system of claim 3, wherein the first switch to maintain a FDB for the first, second, and third VLANs comprises the first switch to add a new MAC address entry to the FDB for each of the first, second, and third VLANs when a new MAC address is learned from the first, second, or third VLAN.

5. The system of claim 1, wherein the second switch further to receive from the MAN a second data packet having the second VLAN ID, to forward the second data packet to the first switch, wherein the first switch to replace the second VLAN ID with the first VLAN ID, and to forward the modified second data packet from the MAN to the first VLAN.

6. The system of claim 1, wherein the first VLAN ID is obtained from a header encapsulating the data packet.

7. The system of claim 6, wherein the header encapsulating the data packet is an Institute of Electrical and Electronics Engineers (IEEE) 802.1Q frame tag.

8. The system of claim 1, wherein the second VLAN ID is obtained from a header encapsulating the data packet.

9. The system of claim 8, wherein the header encapsulating the data packet is an Institute of Electrical and Electronics Engineers (IEEE) 802.1Q frame tag.

10. The system of claim 1, wherein the first VLAN ID is obtained from an internal value stored in the first switch.

11. The system of claim 1, wherein the second VLAN ID is obtained from an internal value stored in the first switch.

12. A method comprising:
   receiving a data packet from a first virtual local area network (VLAN) at a first switch coupled to the first VLAN and a second VLAN, wherein the second VLAN subsumes the first VLAN;
   verifying a first VLAN ID in the data packet, wherein the first VLAN ID is associated with the first VLAN;
   replacing the first VLAN ID with a second VLAN ID associated with the second VLAN; and
   forwarding the modified data packet from the second VLAN to a metropolitan area network (MAN) via a second switch.

13. The method of claim 12, further comprising receiving at the second switch a second data packet from the MAN having the second VLAN ID, replacing the second VLAN ID with the first VLAN ID, and forwarding the modified second data packet to the first VLAN.

14. The method of claim 12, further comprising obtaining the first and second VLAN IDs from the data packet.

15. The method of claim 12, further comprising obtaining the first and second VLAN IDs from internal values stored in the first switch.

16. The method of claim 12, further comprising preventing the data packet originating from the first VLAN from being forwarded to a third VLAN.

17. The method of claim 16, further comprising maintaining a forwarding data base (FDB) for the first, second, and third VLANs, wherein each FDB contains one or more media access control (MAC) address entries, and adding a new MAC address entry to the FDB for each of the first, second, and third VLANs when a new MAC address is learned from the first, second, or third VLAN.

18. An article of manufacture comprising:
a machine accessible medium including content that when accessed by a machine causes the machine to
receive a data packet from a first virtual local area network (VLAN) at a first switch coupled to the first VLAN and a second VLAN, wherein the second VLAN subsumes the first VLAN;
verify a first VLAN ID in the data packet, wherein the first VLAN ID is associated with the first VLAN;
replace the first VLAN ID with a second VLAN ID associated with the second VLAN; and
forward the modified data packet to a metropolitan area network (MAN) via a second switch.

19. The article of manufacture of claim 18, further comprising a machine accessible medium including content that when accessed by a machine causes the machine to receive at the second switch from the MAN a second data packet having the second VLAN ID, replace the second VLAN ID with the first VLAN ID, and forward the modified second data packet from MAN to the first VLAN.

20. A switch comprising:
a port for receiving a data packet from a first virtual local area network (VLAN);
an assigner to assign a first VLAN ID to the data packet that identifies the first VLAN;
a verifier to verify that the assigned first VLAN ID matches a value stored in a memory of the switch;
a controller to control the processing of the verified data packet and to replace the verified first VLAN ID with a second VLAN ID that identifies a second VLAN, wherein the second VLAN subsumes the first VLAN; and
a forwarder to forward the modified data packet to a metropolitan area network (MAN).

21. The switch of claim 20, wherein the assigner further identifies the second VLAN based on the contents of the data packet's source Internet Protocol (IP) address.

22. The switch of claim 20, wherein the assigner to assign the first VLAN ID comprises the assigner to obtain the first VLAN ID from a header encapsulating the data packet.

23. The switch of claim 20, further comprising a preventer to prevent the data packet from being forwarded to a third VLAN.

24. The switch of claim 20, further comprising: a second port for receiving a second data packet from the second VLAN, and wherein the assigner to assign the second VLAN ID to the second data packet that identifies the second VLAN, the verifier to verify that the assigned second VLAN ID matches a second value in the memory of the switch, the controlling to replace the verified second VLAN ID with the first VLAN ID that identifies the first VLAN, and the forwarder to forward the modified second data packet to the first VLAN.

* * * * *